Figure 1:
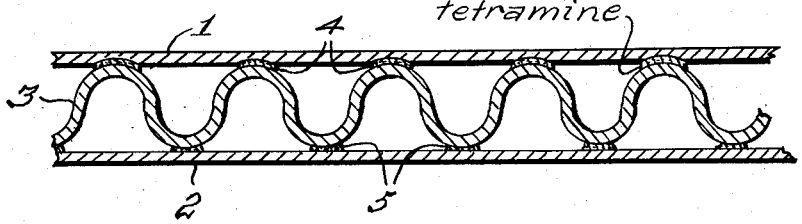

June 11, 1963

H. V. FREYHOLD 3,093,529

MANUFACTURE OF WATER RESISTANT LAMINATES
AND SILICATE ADHESIVE THEREFOR

Filed Sept. 1, 1955

INVENTOR.

Helmut v. Freyhold

BY Henry C. Parker

Attorney.

3,093,529
MANUFACTURE OF WATER RESISTANT LAMINATES AND SILICATE ADHESIVE THEREFOR
Helmut v. Freyhold, Dusseldorf-Oberkassel, Germany, assignor to Philadelphia Quartz Company, Philadelphia, Pa., a corporation of Pennsylvania
Filed Sept. 1, 1955, Ser. No. 531,898
Claims priority, application Germany Sept. 10, 1954
1 Claim. (Cl. 156—325)

This invention relates to manufacture of water resistant laminates and silicate adhesive therefor; and it comprises an improved silicate adhesive in which has been dissolved a small amount usually ranging from about 0.1 to 0.5% of hexamethylene tetramine (urotropine), whereby the adhesive bonds produced by the adhesive are rendered water-resistant. The invention also includes the water-resistant laminates produced by combining plies of fibrous material with the described improved silicate adhesive, the silicate bonds between the plies containing the residues of a small amount of hexamethylene tetramine and having a water-resistance which is many times that of similar laminates produced with a silicate adhesive of identical composition but free from the hexamethylene tetramine; all as more fully hereinafter set forth and as claimed.

Silicate adhesives have found widespread use in the manufacture of combined paper board and other laminates. The principal use of combined paper board is in the manufacture of paper cartons of all types. For many purposes, such as in the packaging of fresh produce and in the export shipment of various materials, the cartons must meet certain rigid specifications of water-resistance. Cartons made with straight silicate adhesives are unable to meet most of these specifications. Many attempts have been made in the past to increase the water-resistance of silicate adhesive bonds by adding to the adhesives various chemicals which are capable of reacting to form insoluble silicates. While some of these modified silicate adhesives produce water-resistant bonds their operating life has usually been so short that most have not been found practical in actual use. The additives in these modified adhesives have reacted slowly with the silicates even in the cold and this accounts for their short operating lives.

I have discovered a chemical which when added to a silicate adhesive remains latent or substantially non-reactive until the adhesive is applied and which therefore produces no detectable or appreciable effect upon its operating life. This is partly due to the fact that the quantity of this chemical required to produce a many fold increase in water-resistance amounts only to from about 0.1 to 0.5% by weight based on the weight of the adhesive. The chemical in question is hexamethylene tetramine. This chemical is inert and substantially non-reactive with silicate adhesives at ordinary temperatures. When the adhesive is heated the hexamethylene tetramine decomposes into formaldehyde and ammonia. Thus when the adhesive is applied and then heated, as in most laminating processes, the setting of the bonds is speeded up and the heat-set bonds surprisingly have a greatly increased water resistance. These bonds will show wet strength even after soaking in water for periods of several days. These bonds therefore have a water resistance which is from 10 to 100 or more times that of bonds produced with adhesives of similar composition but free from the hexamethylene tetramine. The same insolubilizing effect evidently takes place but more slowly even when the adhesive bonds are set in the cold. At least I have found that the water-resistance of hot-set and cold-set bonds is increased approximately to the same extent by the addition of the same amounts of hexamethylene tetramine to the silicate adhesives.

My invention is operative with all the silicate solutions which are used conventionally as adhesives. These have ratios of $Na_2O$ to $SiO_2$ of from about 1:2 to 1:4. The commrcial silicate laminating adhesives can all be improved by the addition of from 0.1 to 0.5% of hexamethylene tetramine, whether they are straight silicate adhesives or whether they contain conventional additives, such as clay, starch, protein materials etc. The only limitations upon additives to be included in my adhesives is that these additives must be inert or non-reactive with the hexamethylene tetramine, at least in the cold.

My preferred compositions are straight silicate adhesives having a ratio of $Na_2O$ to $SiO_2$ ranging from about 1:3.29 to 1:3.35, having a gravity of from about 37° to 43° Bé. (preferably 38°) and a viscosity ranging from about 50 to 400 centipoises, to which there has been added from about 0.2 to 0.4% by weight of hexamethylene tetramine as a bond-insolubilizing agent. Since hexamethylene tetramine is rather expensive no more should be added than is required to produce the desired insolubilization of the bonds produced. Not substantially more than 0.5% by weight is required to produce this effect and any additional is wasteful if not detrimental.

Figure 2:
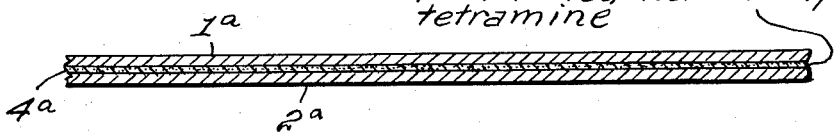

In the accompanying drawing I have shown, more or less diagrammatically, two embodiments of the combined paper board of my invention. In this showing:

FIG. 1 is a cross section through a corrugated paper board taken in a direction transverse to the flutes, while FIG. 2 is a cross section through a solid fiber board showing the adhesive bond.

In FIG. 1 the upper facing sheet is shown at 1, the corrugated ply at 3 and the lower ply at 2. The upper bonds 4 are known as single-face bonds and these usually penetrate the surface of the facing sheet owing to the high pressure under which they are formed. The lower bonds 5 are the double-backer or double-face bonds which are relatively thick since produced under a lower pressure. These bonds when produced with my improved adhesive contain residues of hexamethylene tetramine which can be detected by analysis even though a quantitative analysis would be difficult.

In FIG. 2 the solid fiber board is produced with an upper ply 1a and a lower ply 2a, these plies being united with a silicate adhesive bond 4a containing residues of hexamethylene tetramine.

In a specific example which represents a practical operating embodiment of my invention, two plywood boards having a width of 30 mm. were bonded with a silicate adhesive, the bond having a glue line length of 20 mm. The adhesive used was a 38° Bé. silicate of soda solution having a ratio of $Na_2O$ to $SiO_2$ of 1:3.3 to which had been added 0.3% of hexamethylene tetramine. After this bond had been cured or thoroughly dried at room temperatures it was tested for water resistance in comparison with a second test specimen made from the same plywood bonded in the same manner with a silicate adhesive identical with the first except that it contained no hexamethylene tetramine. The two test specimens were immersed in water at room temperature and a tension amounting to 500 g. was applied across the bonds. Under these conditions the bond made with the adhesive free from hexamethylene tetramine failed within about 30 minutes whereas the bond made with the hexamethylene tetramine-containing adhesive resisted the tension for more than 7 days.

While I have described what I consider to be the more advantageous embodiments of my invention it is obvious, of course, that various modifications can be made in the various procedures and compositions which have been disclosed without departing from the purview of this invention. Thus while I have mentioned sodium silicate adhesives only, my invention is also applicable to other alkali metal silicate adhesives and to all adhesives in which an alkali metal silicate constitutes the principal binding agent. My adhesive can be applied either hot or cold. Heating reduces the life of the adhesive but not excessively. Preservatives can be included in my adhesives, also other additions, such as clay, silica sand, glycerine, starch, dextrine, bitumen etc.

Dry-mix adhesives within the present invention can be made by mixing powdered hexamethylene tetramine in proper proportions with any of the conventional dry-mix silicate adhesives. When water is added to these mixes to dissolve the silicate, the hexamethylene tetramine also goes into solution. The amount of hexamethylene tetramine added to dry-mix silicate adhesives should be within the range of from about 0.3 to 1.5% by weight. These same percentages of hexamethylene tetramine are present, at least theoretically, in freshly-formed dried adhesive bonds but some of the decomposition products of hexamethylene tetramine probably escape from the bonds in time, which would make a quantitative analysis difficult if not impossible.

Other modifications of this invention which fall within the scope of the following claim will be immediately evident to those skilled in this art.

What I claim is:

A novel method of bonding together two plies of fibrous material which comprises applying an adhesive composition between said plies, said adhesive composition being capable of producing water-resistant bonds and comprising a sodium silicate solution having a ratio of $Na_2O$ to $SiO_2$ within the range of from about 1:2 to 1:4, a viscosity ranging from about 50 to 400 centipoises and a gravity of from about 37° to 43° Baumé, and containing dissolved therein from about 0.1 to 0.5 wt. percent of hexamethylene tetramine, then applying heat to decompose the hexamethylene tetramine into ammonia and formaldehyde, and thereby effecting a water-resistant bond between said two plies.

References Cited in the file of this patent

UNITED STATES PATENTS

| | | |
|---|---|---|
| 1,832,752 | Thoretz | Aug. 1, 1927 |
| 1,976,435 | Cone et al. | Oct. 9, 1934 |
| 2,044,466 | Cleveland | June 16, 1936 |
| 2,069,486 | Tilden | Feb. 2, 1937 |
| 2,287,411 | Boller et al. | June 23, 1942 |
| 2,434,466 | Marc | Jan. 13, 1948 |
| 2,704,268 | Brown | Mar. 15, 1955 |